United States Patent [19]

Uchiyama

[11] Patent Number: 5,802,486
[45] Date of Patent: Sep. 1, 1998

[54] SUSPENSION CONTROL SYSTEM HAVING A SHOCK ABSORBER CONTROLLED TO PREDETERMINE COMPRESSION AND EXTENSION DAMPING FORCES WHEN VEHICLE IS RUNNING ON A BAD ROAD

[75] Inventor: Masaaki Uchiyama, Chiba-ken, Japan

[73] Assignee: Tokico, Ltd.

[21] Appl. No.: 527,343

[22] Filed: Sep. 12, 1995

[30] Foreign Application Priority Data

Sep. 20, 1994 [JP] Japan .................. 6-251260

[51] Int. Cl.$^6$ .............. F16F 9/46; B60G 11/26
[52] U.S. Cl. .............. 701/37; 701/38; 701/39; 280/707; 280/840
[58] Field of Search .............. 364/424.046, 424.047, 364/424.048; 280/707, 840, 709, 688; 188/299, 319, 280

[56] References Cited

U.S. PATENT DOCUMENTS

| | | | |
|---|---|---|---|
| 4,468,050 | 8/1984 | Woods et al. | 280/707 |
| 4,756,549 | 7/1988 | Kurosawa | 280/707 |
| 5,090,728 | 2/1992 | Yokoya et al. | 280/707 |
| 5,269,557 | 12/1993 | Butsuen et al. | 364/424.046 |
| 5,324,067 | 6/1994 | Kallenbach et al. | 280/707 |
| 5,425,436 | 6/1995 | Teramura et al. | 180/280 |
| 5,487,006 | 1/1996 | Kakizaki et al. | 364/424.047 |
| 5,490,068 | 2/1996 | Shimizu et al. | 364/424.047 |
| 5,522,482 | 6/1996 | Kashiwagi et al. | 188/299 |
| 5,533,597 | 7/1996 | Nezu et al. | 280/707 |
| 5,572,426 | 11/1996 | Sasaki et al. | 364/424.046 |

FOREIGN PATENT DOCUMENTS

| | | |
|---|---|---|
| 4-221213 | 8/1992 | Japan . |
| 5-330325 | 12/1993 | Japan . |

*Primary Examiner*—Tan Q. Nguyen
*Attorney, Agent, or Firm*—Wenderoth, Lind & Ponack, L.L.P.

[57] ABSTRACT

A suspension control system for a vehicle enables excellent ride quality and excellent running stability to be obtained even when the vehicle is running on a bad road. When a road surface condition judging circuit judges that the vehicle is running on a bad road, a damping coefficient preferential setting circuit preferentially sets the compression-side damping coefficient of a damping coefficient varying type shock absorber to a predetermined large value, and consequently sets the extension-side damping coefficient to a small value. Thus, the ride quality is prevented from being degraded by control delay. Further, uncontrollable movement of non-suspended members is effectively suppressed, and thus the condition of contact between the wheels and the ground is improved. Accordingly, even if the vehicle is steered during running on a bad road, no drift-out occurs. Thus, excellent running stability can be ensured.

9 Claims, 4 Drawing Sheets

SUSPENSION CONTROL SYSTEM HAVING A SHOCK ABSORBER CONTROLLED TO PREDETERMINE COMPRESSION AND EXTENSION DAMPING FORCES WHEN VEHICLE IS RUNNING ON A BAD ROAD

BACKGROUND OF THE INVENTION

The present invention relates to a suspension control system for controlling a damping force according to vibration of a vehicle body by using a damping force control type shock absorber which is interposed between the vehicle body and an axle, and which enables the damping force to be controlled such that, when the extension-side damping force is small, the compression-side damping force is controlled between small and large values, whereas, when the compression-side damping force is small, the extension-side damping force is controlled between small and large values.

As one example of conventional suspension control systems, there is a suspension control system arranged as shown in FIGS. 1 to 9 of Japanese Patent Application Unexamined Publication (KOKAI) Number (hereinafter referred to as "JP(A)") 5-330325. The conventional suspension control system has a damping coefficient varying type (damping force control type) shock absorber which enables the damping coefficient to be controlled such that, when the extension-side damping coefficient (damping force) is small, the compression-side damping coefficient (damping force) is controlled between small and large values, whereas, when the compression-side damping force is small, the extension-side damping force is controlled between small and large values, in the same way as in the case of a shock absorber used in an embodiment of the present invention (see FIGS. 2 and 3 in the accompanying drawings). The conventional system further has an actuator for controlling and setting a damping coefficient of the shock absorber, an acceleration sensor for detecting a vertical acceleration acting on the vehicle body, a device for integrating the acceleration signal from the acceleration sensor to obtain a vertical absolute velocity, and a device for controlling the shock absorber through the actuator on the basis of the vertical absolute velocity. Thus, the conventional suspension control system obtains a damping coefficient corresponding to the vertical absolute velocity, thereby improving the ride quality, drivability, etc.

Regarding the terms "damping force" and "damping coefficient" in the foregoing description, in a shock absorber which is designed to control the passage area, as shown in FIGS. 2 and 3, the damping force changes according to the piston speed. Therefore, the control of the passage area actually means the control of the damping coefficient. However, the control of the damping coefficient results in the control of the damping force. Accordingly, the damping coefficient and the damping force are generally referred to as "damping force" without distinction.

JP(A) 5-141437 discloses a suspension control system which uses a shock absorber having an electromagnetic proportional pressure control valve, as shown in an embodiment illustrated in FIG. 2 of the publication. In the conventional suspension control system, a vertical absolute velocity of the vehicle body is obtained in the same way as in the system disclosed in JP(A) 5-330325, and the valve body of the electromagnetic proportional pressure control valve is biased in one direction according to the vertical absolute velocity, thereby controlling the pressure on either one of the extension and compression sides so that a relatively large damping force is generated during either the extension or compression stroke, and a relatively small damping force is generated during the other stroke.

Incidentally, in the above-described conventional technique of JP(A) 5-330325, vibration control is effected by assuming an average piston speed obtained when the vehicle is running on an ordinary paved road surface (on which the vibration of the vehicle body has a relatively low frequency and a relatively small amplitude). Accordingly, when the vehicle is running on a rough road surface (bad road), the piston speed may become much higher than the average piston speed, causing the damping force to become larger than demanded. Thus, the ride quality may be degraded by the over-control.

Further, the conventional techniques disclosed in JP(A) 5-330325 and 5-141437 suffer from the problem that, when the vehicle is running on a bad road, the vehicle body vibrates violently, and the damping force, which is a target of the control, varies drastically. Therefore, there are cases where the control cannot follow the variation of the damping force, resulting in a failure to obtain the necessary damping force, or causing the damping force to become larger than is necessary. Thus, the control of the damping force may cause the ride quality to be degraded, contrary to the intention.

One approach to solving the above problem is to suspend the control of the damping force according to the vibration of the vehicle and reduce the damping force on both the extension and compression sides when the vehicle is running on a bad road. However, if the control is suspended, the damping force is reduced on both the extension and compression sides. Consequently, although it is possible to reduce the sensation of being thrust upwardly that is given to the occupant during running on a bad road, the vibration cannot effectively be damped, and the vehicle body is placed in unnaturally soft suspended conditions, making the occupant feel uncomfortable. In addition, since the vibration cannot sufficiently be damped, the condition of contact between the wheels and the ground is deteriorated, and the wheels become likely to slip. When cornering on a bad road, the vehicle is likely to drift. Thus, the steering stability deteriorates.

It is necessary, in order to solve the above-described problem, to increase the damping force on the extension or compression side to a certain extent when the vehicle is running on a bad road, instead of adopting the conventional practice in which the control of the damping force according to the vibration of the vehicle body is suspended, and the damping force is reduced on both the extension and compression sides. It should be noted that the shock absorber according to the present invention is incapable of increasing the damping force on the compression side at the same time as the damping force on the extension side is increased.

If the damping force on the extension side is increased, the damping force on the compression side decreases as a consequence. Therefore, when a wheel runs onto a projection, the upward impact (acceleration), is reduced by, and thus the sensation of being thrust upwardly, given to the occupant reduces, is also reduced. In addition, the problem that the vibration cannot satisfactorily be damped is also solved.

However, if such control is actually carried out, it takes time for a wheel to come into contact with the ground after riding over a projection, because the damping force on the extension side is large, and hence the wheel delays extending. Further, the suspended member (vehicle body) is pulled by the non-suspended member (wheel), and the downward acceleration acting on the vehicle body increases. The downward acceleration makes the occupant feel as if he or she were thrown out of the seat. Thus, the occupant feels exceedingly uncomfortable. In general, occupants of vehicles feel more uncomfortable with the downward acceleration, than with the upward acceleration as will be understood from one's experience in an elevator, in which the occupants feel more uncomfortable when going down than when going up.

SUMMARY OF THE INVENTION

In view of the above-described circumstances, an object of the present invention is to provide a suspension control system for a vehicle which enables an excellent ride quality and excellent running stability to be obtained even when the vehicle is running on a bad road.

The present invention provides a suspension control system having a damping force control type shock absorber which is interposed between the body of a vehicle and an axle, and which enables the damping force to be controlled such that, when the extension-side damping force is small, the compression-side damping force is controlled between small and large values, whereas, when the compression-side damping force is small, the extension-side damping force is controlled between small and large values. The suspension control system further has a device for detecting vertical vibration of the vehicle body, and a device for controlling the shock absorber on the basis of a signal detected by the vertical vibration detecting device. According to the present invention, the suspension control system is provided with a road surface condition judging device for judging whether or not the vehicle is running on a bad road, and a device for setting the compression-side damping force to a predetermined value which is larger than the above-described small value in preference to the control device when the road surface condition judging device judges that the vehicle is running on a bad road.

By virtue of the above-described arrangement, when the vehicle is running on a bad road, the compression-side damping coefficient is preferentially set to a predetermined large value. Therefore, the compression-side damping force is set to a predetermined value which is larger than the preset small value in preference to the control that is effected on the basis of vertical vibration. Accordingly, there is no likelihood of the ride quality being degraded by control delay. Further, it is possible to prevent both the extension- and compression-side damping forces from being reduced by, which would otherwise degrade the steering stability.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DESCRIPTION OF THE PREFERRED EMBODIMENTS

Figure 1:
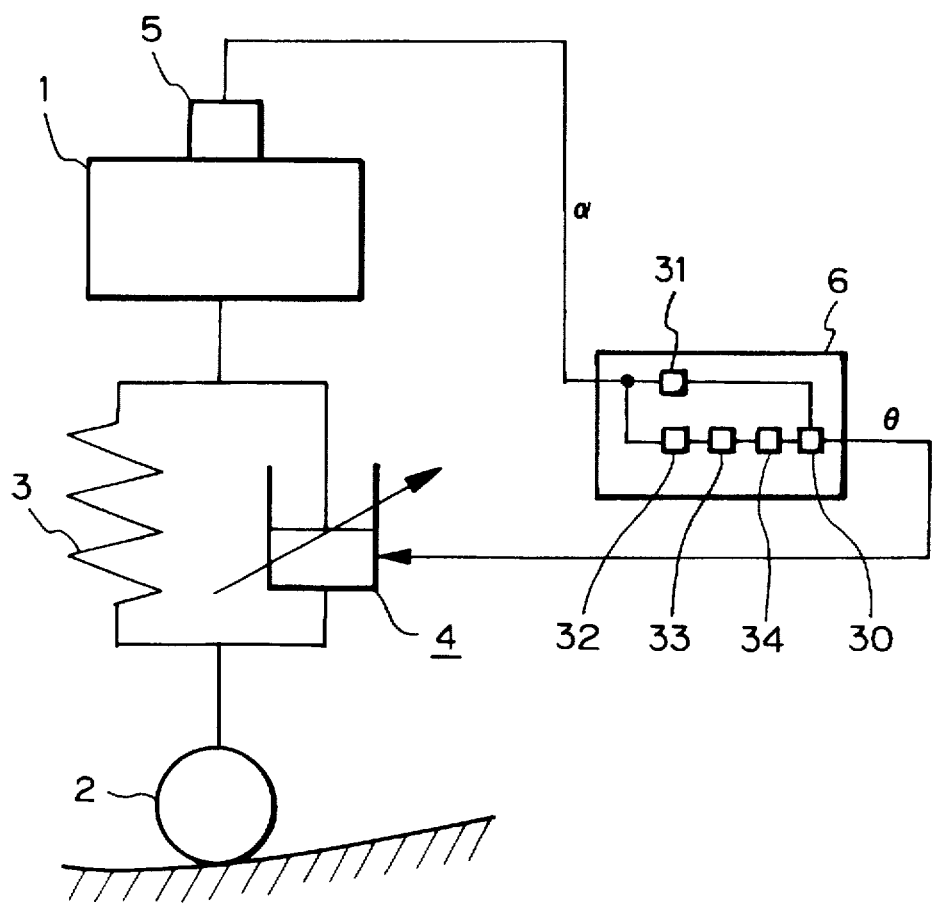
FIG. 1 schematically shows one embodiment of the suspension control system according to the present invention.

One embodiment of the suspension control system according to the present invention will be described below with reference to FIGS. 1 to 5. Referring to FIG. 1, a vehicle has a vehicle body (suspended member or sprung mass) 1 and four (only one of them is illustrated in the figure) wheels (non-suspended members or unsprung mass) 2. A spring 3 and a damping coefficient varying type (damping force control type) shock absorber 4 are interposed in parallel between the vehicle body 1 and each wheel 2, thereby suspending the vehicle body 1. The shock absorber 4 is of the extension/compression inverting type in which as either one of the compression- and extension-side damping coefficients is gradually increased, the other damping coefficient gradually decreases. The vehicle body 1 is equipped with an acceleration sensor (vertical vibration detecting device) 5 for detecting a vertical acceleration acting on the vehicle body 1. An acceleration signal detected by the acceleration sensor 5 is supplied to a controller 6. It should be noted that, although a total of four combinations of shock absorbers 4 and springs 3 are provided to correspond to the four wheels 2, only one combination is shown in the figure for the sake of convenience.

Figure 2:
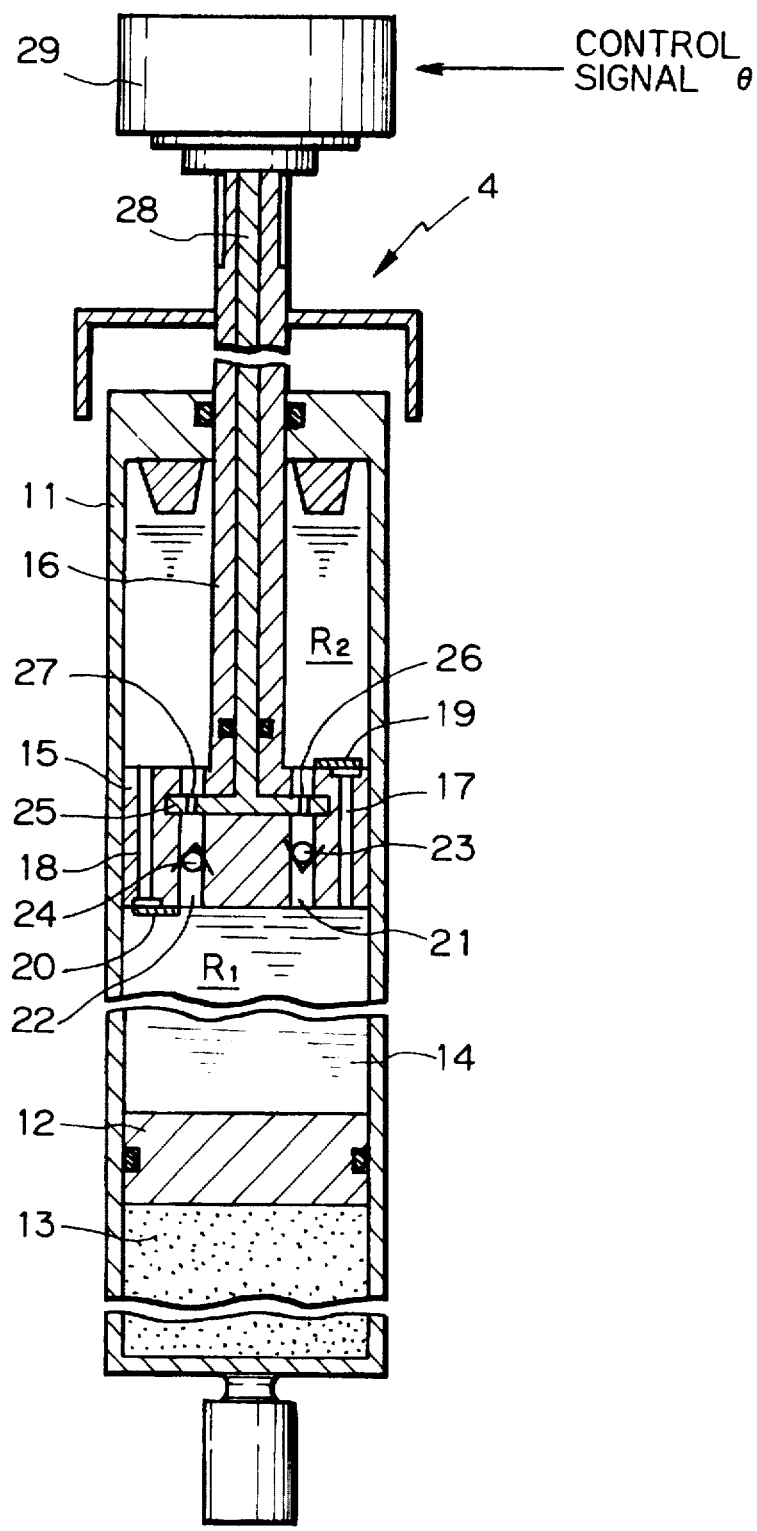
FIG. 2 is a sectional view of a damping coefficient varying type shock absorber used in the suspension control system of the present invention.

As shown in FIG. 2, the damping coefficient varying type shock absorber 4 has a cylinder 11. A free piston 12 is slidably fitted in the cylinder 11 to divide the inside of the cylinder 11 into two chambers, that is, a gas chamber 13 and an oil chamber 14. The gas chamber 13 has a high-pressure gas sealed therein. The oil chamber 14 has a hydraulic fluid sealed therein. A piston 15 is slidably fitted in the oil chamber 14. The oil chamber 14 is divided into a lower chamber R1 and an upper chamber R2 by the piston 15. A piston rod 16 is connected to the piston 15. The piston rod 16 extends through the upper chamber R2 and projects outside the cylinder 11.

The piston 15 is provided with first and second communicating passages 17 and 18 which provide communication between the lower and upper chambers R1 and R2. A first normally-closed damping valve 19 is attached to the upper end of the piston 15. The first damping valve 19 opens when the pressure difference between the lower and upper chambers R1 and R2 reaches a predetermined value as a result of the rise of pressure in the lower chamber R1 during the compression stroke of the piston rod 16, thereby providing communication between the lower and upper chambers R1 and R2 through the first communicating passage 17. A second normally-closed damping valve 20 is attached to the lower end of the piston 15. The second damping valve 20 opens when the pressure difference between the lower and upper chambers R1 and R2 reaches a predetermines value as a result of the rise of pressure in the upper chamber R2 during the extension stroke of the piston rod 16, thereby providing communication between the lower and upper chambers R1 and R2 through the second communicating passage 18. The piston 15 is provided with third and fourth communicating passages 21 and 22 which face each other across the axis of the piston rod 16. The third and fourth communicating passages 21 and 22 are each communicated with the upper and lower chambers R2 and R1.

Figure 3:
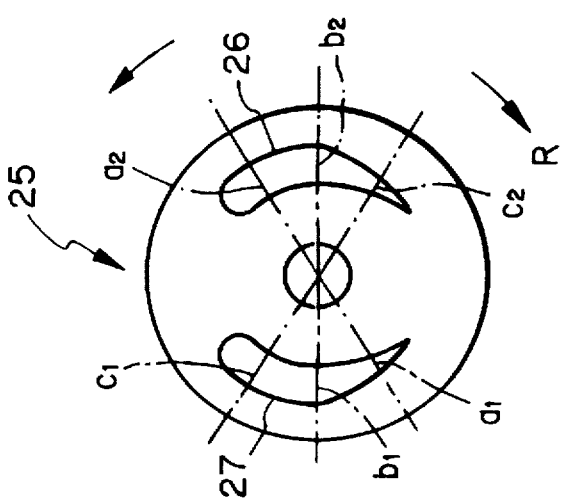
FIG. 3 is a plan view of a movable plate incorporated in the shock absorber shown in FIG. 2.

The third and fourth communicating passages 21 and 22 are provided with check valves 23 and 24, respectively. The check valve 23 allows the flow of hydraulic fluid only from the lower chamber R1 toward the upper chamber R2, whereas the check valve 24 allows the flow of hydraulic fluid only from the upper chamber R2 toward the lower chamber R1. The piston 15 has a disk-shaped movable plate 25 retained therein such that the movable plate 25 is rotatable about the axis of the piston rod 16. The plane of the movable plate 25 crosses the third and fourth communicating passages 21 and 22. As shown in FIG. 3, the movable plate 25 is provided with a pair of elongated holes 26 and 27 which face each other across the axis of the movable plate 25. The elongated holes 26 and 27 extend circumferentially of the movable plate 25 in concentric relation to the center of the movable plate 25. The elongated hole 26 has such a configuration that the opening area thereof gradually decreases in the direction of the arrow R in FIG. 3. The opening area of the elongated hole 27 gradually increases in the direction of the arrow R.

Figure 4:
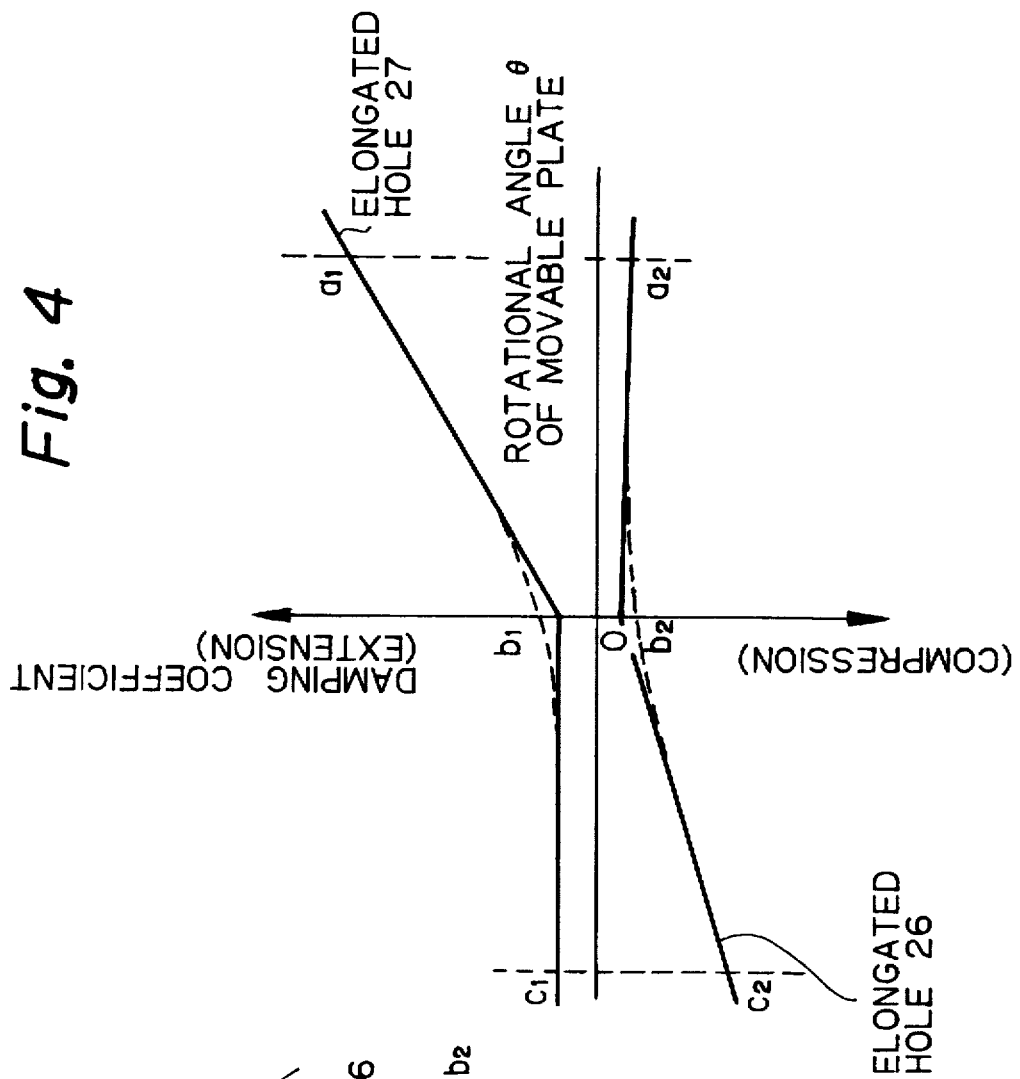
FIG. 4 is a graph showing the relationship between the rotational angle of the movable plate and the damping coefficient.

Thus, as the movable plate 25 is rotated in the direction of the arrow R or L, portions of the elongated holes 26 and 27 which face the third and fourth communicating passages 21 and 2 continuously change, causing the opening areas of the third and fourth communicating passages 21 and 22 to increase or decrease gradually, thereby enabling the damping coefficient varying type shock absorber 4 to obtain damping characteristics as shown by the solid lines in FIG. 4.

It should be noted that reference numeral 28 in FIG. 2 denotes a control rod which axially extends through the piston rod 16 in such a manner as to be rotatable relative to the piston rod 16. The lower end portion of the control rod 28 is connected to the movable plate 25. An actuator 29, e.g. a stepping motor, is connected to the upper end portion of the control rod 28 to rotate the movable plate 25 in the direction of the arrow R or L through the control rod 28. The actuator 29 rotates the control rod 28 on the basis of a control signal θ delivered from a control signal generator 30 of the controller 6.

Next, the relationship between the damping coefficient and positions (a2-b2-c2, and a1-b1-c1) of the elongated holes 26 and 27 which face the third and fourth communicating passages 21 and 22 will be explained. Here, positions of the elongated holes 26 and 27 which face the third and fourth communicating passages 21 and 22 are expressed by the rotational angle θ of the movable plate 25. It should be noted that a position of the movable plate 25 at which the positions b2 and b1, which are the centers of the elongated holes 26 and 27, face the third and fourth communicating passages 21 and 22 is defined as the reference position (θ=0) of the movable plate 25.

(1) When the movable plate 25 is rotated in the direction of the arrow R from the reference position, that is, when the movable plate 25 is rotated in the positive direction (θ>0), the position a2 of the elongated hole 26 faces the third communicating passage 21, and the position a1 of the elongated hole 27 faces the fourth communicating passage 22. Consequently, it becomes easy for the hydraulic fluid to flow from the lower chamber R1 to the upper chamber R2 but difficult for the hydraulic fluid to flow from the upper chamber R2 to the lower chamber R1. Thus, the extension-side damping coefficient increases, and the compression-side damping coefficient decreases.

(2) When the movable plate 25 is rotated in the direction of the arrow L from the reference position, that is, when the movable plate 25 is rotated in the negative direction (θ<0), the position c2 of the elongated hole 26 faces the third communicating passage 21, and the position c1 of the elongated hole 27 faces the fourth communicating passage 22. Consequently, it becomes difficult for the hydraulic fluid to flow from the lower chamber R1 to the upper chamber R2 but easy for the hydraulic fluid to flow from the upper chamber R2 to the lower chamber R1. Thus, the extension-side damping coefficient decreases, and the compression-side damping coefficient increases.

Figure 5:
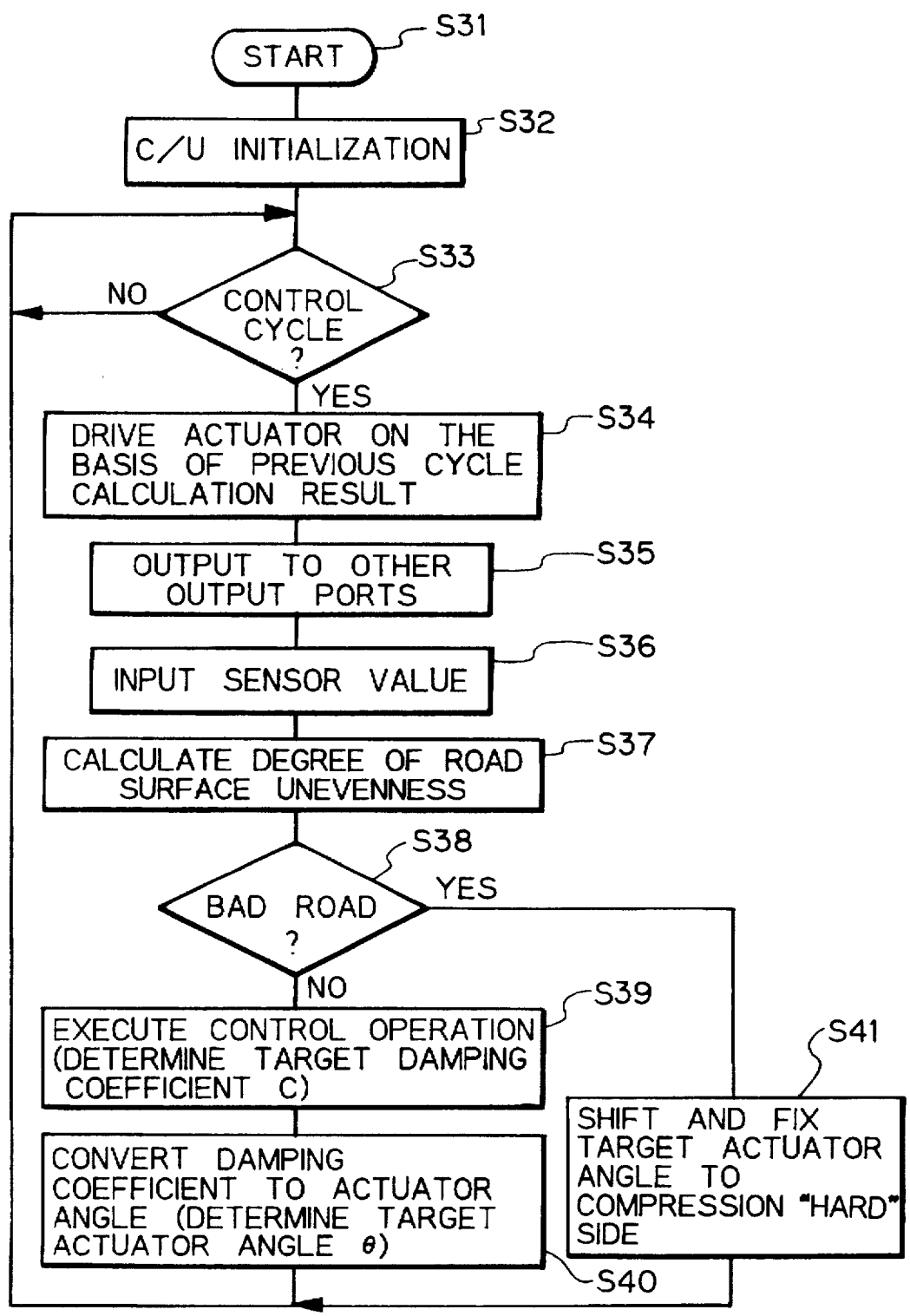
FIG. 5 is a flowchart showing an operation of a controller used in the suspension control system of the present invention.

The controller 6 has an integrating circuit 31 for integrating a signal detected by the acceleration sensor 5 to obtain a vertical absolute velocity, and an unevenness calculating circuit 32 for calculating a degree of unevenness on the road surface on the basis of a signal detected by the acceleration sensor 5. The controller 6 further has a road surface condition judging circuit 33 for judging whether or not the vehicle is running on a bad road by comparing the calculated degree of unevenness on the road surface with a preset reference value, and a damping coefficient preferential setting circuit 34 for preferentially setting the compression-side damping coefficient to a predetermined value (θ1 in FIG. 4) through the actuator 29 when the road surface condition judging circuit 33 judges that the vehicle is running on a bad road. In addition, the controller 6 has a control signal generator 30. The controller 6 is designed to execute arithmetic processing and control as shown in FIG. 5.

The contents of the arithmetic processing and control executed by the controller 6 will be explained below with reference to FIG. 5.

When electric power is supplied (Step S31) in response to starting of the vehicle engine, initialization is executed (Step S32). Then, it is judged whether or not a control cycle has been reached (Step S33). At Step S33, the judging process is repeated until it is judged that the control cycle has been reached.

If it is judged at Step S33 that the control cycle has been reached, the actuator 29 is driven on the basis of the result in the previous control cycle (Step S34). Subsequently, a signal is outputted to a member other than the actuator 29, for example, an indicator (LED), at Step S35. Next, an acceleration signal a is read from the acceleration sensor 5 (Step S36). Subsequently, a degree of unevenness on the road surface is obtained from, for example, the rate of change of the acceleration signal a per unit time (Step S37). Next, the degree of road surface unevenness thus obtained is compared with a preset reference value to judge whether or not the vehicle is running on a bad road (Step S38). If NO is the answer at Step S38, that is, if it is judged that the vehicle is not running on a bad road, the integrating circuit 31 obtains a vertical absolute velocity, and a target damping coefficient C is determined on the basis of the vertical absolute velocity (Step S39). At Step S40, a target actuator angle (movable plate rotational angle) θ is obtained on the basis of the contents of processing executed at Step S39, and the control process returns to Step S33. It should be noted that, in the subsequent control cycle (Step S34) after the control process has returned to Step S33, a control signal θ corresponding to the movable plate rotational angle θ is outputted to the actuator 29 to obtain the desired damping coefficient (target damping coefficient C).

If YES is the answer at Step S38, that is, if it is judged that the vehicle is running on a bad road, a control signal θ is outputted to the actuator 29 so that the movable plate rotational angle (target actuator angle) θ assumes the position of θ1 in FIG. 4 to change the damping force to a predetermined value, thereby setting the compression-side damping coefficient to a slightly large value, and consequently setting the extension-side damping coefficient to a small value owing to the characteristics of the shock absorber (Step S41). Then, the control process returns to Step S33. It should be noted that, in the subsequent control cycle (Step S34) after the control process has returned to Step S33, a control signal θ corresponding to the movable plate rotational angle θ is outputted to the actuator 29 to obtain the desired damping coefficient (target damping coefficient C).

In the suspension control system arranged as described above, when the vehicle is running on a bad road, the road surface condition judging circuit 33 judges that the vehicle is running on a bad road (i.e. YES is the answer at Step S38), and the controller 6 sets the extension-side damping coefficient to a small value and also sets the compression-side damping coefficient to a relatively large value (i.e. a predetermined value which is larger than the small value) through the actuator 29. During the running on the bad road, the control based on the vertical absolute velocity is not carried out, but the extension- and compression-side damping coefficients are fixed to the set values.

Thus, there is no likelihood of the control being delayed when the vehicle is running on a bad road. Further, there is no possibility that vibration will not effectively be damped, causing the ride quality and the steering stability to be degraded, as in a case where both the extension- and compression-side damping coefficients are reduced.

In the actual application of the control according to this embodiment, when a wheel runs onto a projection, an upward thrust (upward acceleration) occurs because the compression-side damping force is large. However, since the extension-side damping force is small, the wheel immediately extends before it comes into contact with the ground after riding over the projection. Therefore, the time required for the wheel to come into contact with the ground is short. Moreover, the non-suspended member (wheel) can extend relatively freely. Accordingly, the suspended member (vehicle body) will not be pulled by the non-suspended member (wheel). Thus, the downward acceleration acting on the vehicle body reduces.

Therefore, the downward acceleration can be favorably reduced, although the sensation of being thrust upwardly (upward acceleration) increases in comparison to a case where the extension-side damping force is increased. However, the occupant does not feel very uncomfortable with the upward acceleration because his/her body is supported by the seat, but feels uncomfortable with the downward acceleration, as has been described above. Accordingly, even when the vehicle is running on a bad road, the ride quality is improved in comparison to a case where the extension-side damping force is increased.

The above-described predetermined value of the compression-side damping force which is larger than the small value is preferably a damping force on the order of 700N in a shock absorber which is mounted on a vehicle having a weight on the order of 2 tons, and in which the damping force is controlled between about 1,200N (c2 in FIG. 4) and 500N (a2 in FIG. 4) when the piston speed is 0.3 m/s. The damping force of 700N is about a half of the compression-side damping force of a shock absorber used in an automobile having no damping force control mechanism.

Although in the foregoing embodiment a vertical acceleration sensor is used to judge a bad road, it should be noted that the vertical acceleration sensor may be replaced by a vehicle height sensor. In such a case, when the frequency of the vehicle height sensor exceeds a predetermined value, it is judged that the vehicle is running on a bad road. Road surface conditions may be judged by directly measuring road surface conditions with an ultrasonic sensor. Even when the vehicle is running on a bad road, when the vehicle speed is low, no problem arises even if both the extension- and compression-side damping forces are reduced. Therefore, the predetermined value for the compression-side damping force may be changed according to the vehicle speed. One example of a method of judging a bad road is disclosed in Japanese Patent Application No. 5-353204 (U.S. Ser. No. 361,554); this method may be used in the present invention.

Further, although in the foregoing embodiment a shock absorber in which the damping force (damping coefficient) is controlled by varying the passage area has been described, it should be noted that the present invention is not limited to the described shock absorber, but may be applied to a shock absorber of the type in which damping force is directly controlled by using an electromagnetic proportional pressure control valve as shown in the embodiments of FIG. 2 in JP(A) 5-141437 and FIG. 1 in JP(A) 6-330977. In this case, when the vehicle is running on a bad road, the electric current is adjusted so that the compression-side pressure is properly controlled. By doing so, the compression-side damping force can be set to a slightly large value with the extension-side damping force set to a small value.

It should be noted that the present invention can be applied to any type of shock absorber in which, when an actuator (including an electromagnetic valve) is moved in one direction from a predetermined position (e.g. an intermediate position), the compression-side damping force is kept approximately constant at a low value, and the extension-side damping force can be controlled from a small value to a large value, whereas, when the actuator is moved in the other direction from the predetermined position, the extension-side damping force is kept approximately constant at a low value, and the compression-side damping force can be controlled from a small value to a large value.

According to the suspension control system of the present invention, arranged as described above, when the vehicle is running on a bad road, the compression-side damping force is set to a predetermined value which is larger than a preset small value in preference to the control that is effected on the basis of vertical vibration. Accordingly, there is no likelihood of the ride quality being degraded by control delay. Further, it is possible to prevent both the extension- and compression-side damping forces from reducing, which would otherwise degrade the steering stability. Since not the extension-side damping force but the compression-side damping force is increased, the downward acceleration acting on the vehicle body is prevented from increasing. Thus, it is possible to reduce the uncomfortable feeling given to the occupant when the vehicle is running on a bad road.

Although the present invention has been described through specific terms, it should be noted here that the described embodiments are not necessarily exclusive and that various changes and modifications may be imparted thereto without departing from the scope of the invention which is limited solely by the appended claims. For example, various control logics disclosed in JP(A) 7-232530 can be used as road condition judging means in this invention.

What is claimed is:

1. A suspension control system comprising:

a damping force control shock absorber interposed between a body of a vehicle and an axle, wherein said shock absorber has an extension damping force variable between a small value and a large value and a compression damping force variable between a small value and a large value, wherein said shock absorber can be controlled such that while the extension damping force is maintained at the small value, the compression damping force can be controlled between the small value and the large value thereof, and while the compression damping force is maintained at the small value, the extension damping force can be controlled between the small value and the large value thereof;

a vertical vibration detecting means for detecting vertical vibration of the said body and producing a signal representing the vertical vibration;

a main control means for controlling said shock absorber on the basis of said signal from said vertical vibration detecting means by selecting a value of the extension damping force and a value of the compression damping force in dependence on the vertical vibration represented by said signal;

a road surface condition judging means for judging the road surface condition of a road on which the vehicle runs by determining whether or not the vehicle is running on a bad road; and a means for setting said compression damping force at a predetermined value larger than the small value of said compression damping force and accordingly setting said extension damping force to the small value of the extension damping force, in preference to control by said main control means, when said road surface condition judging means judges that the vehicle is running on a bad road, and maintaining the set compression damping force and the set extension damping force fixed while said road surface condition judging means judges that the vehicle is running on a bad road.

2. The suspension control system of claim 1, wherein said vertical vibration detecting means comprises an acceleration sensor for detecting vertical acceleration of said body and said signal represents the detected acceleration.

3. The suspension control system of claim 2, wherein said vertical vibration detecting means further comprises means for integrating said signal so as to determine absolute vertical velocity of said body.

4. The suspension control system of claim 2, wherein said road surface condition judging means judges the road surface condition based on said signal from said vertical vibration detecting means.

5. A suspension control system comprising:

an extendible and compressible damping force control shock absorber for interposition between a body of a vehicle and an axle, wherein said shock absorber has a mechanism that can create an extension damping force variable between a small value and a large value and a compression damping force variable between a small value and a large value, and wherein said shock absorber can be controlled such that while the extension damping force is maintained at the small value, the compression damping force can be controlled between the small value and the large value thereof, and while the compression damping force is maintained at the small value, the extension damping force can be controlled between the small value and the large value thereof;

a vertical vibration detecting means for detecting vertical vibration of the body and producing a signal representing the vertical vibration;

a road surface condition judging means for judging the road surface condition of a road on which the vehicle runs by determining the degree of unevenness of the road surface, comparing the degree of unevenness with a preset reference value and deciding, based on the comparison, whether the road is good or bad; and a main control means for controlling said shock absorber on the basis of said signal from said vertical vibration detecting means by selecting a value of the extension damping force and a value of the compression damping force in dependence on the vertical vibration represented by said signal when said road surface condition judging means judges that the vehicle is running on a good road; and a means for setting said compression damping force at a fixed predetermined value larger than the small value of said compression damping force and said extension damping force to the small value of the extension damping force when said road surface condition judging means judges that the vehicle is running on a bad road, and maintaining the set compression damping force and the set extension damping force fixed while said road surface condition judging means judges that the vehicle is running on a bad road.

6. The suspension control system of claim 5, wherein said vertical vibration detecting means comprises an acceleration sensor for detecting vertical acceleration of said body and said signal represents the detected acceleration.

7. The suspension control system of claim 6, wherein said vertical vibration detecting means further comprises means for integrating said signal so as to determine absolute vertical velocity of said body.

8. The suspension control system of claim 6, wherein said road surface condition judging means judges the road surface condition based on said signal from said vertical vibration detecting means.

9. The suspension control system of claim 5, wherein while said road surface condition judging means continues to judge that the vehicle is running on a bad road, the compression damping force is maintained fixed at the predetermined value larger than the small value and the extension damping force is maintained fixed at the small value.

* * * * *